Oct. 13, 1959
G. J. BENES
2,908,195
TURRET TOOLPOST
Filed Jan. 20, 1958
2 Sheets-Sheet 1
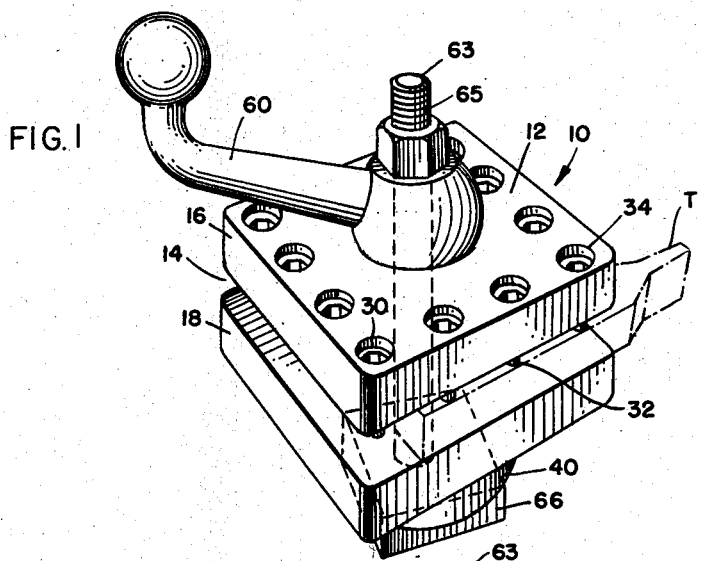
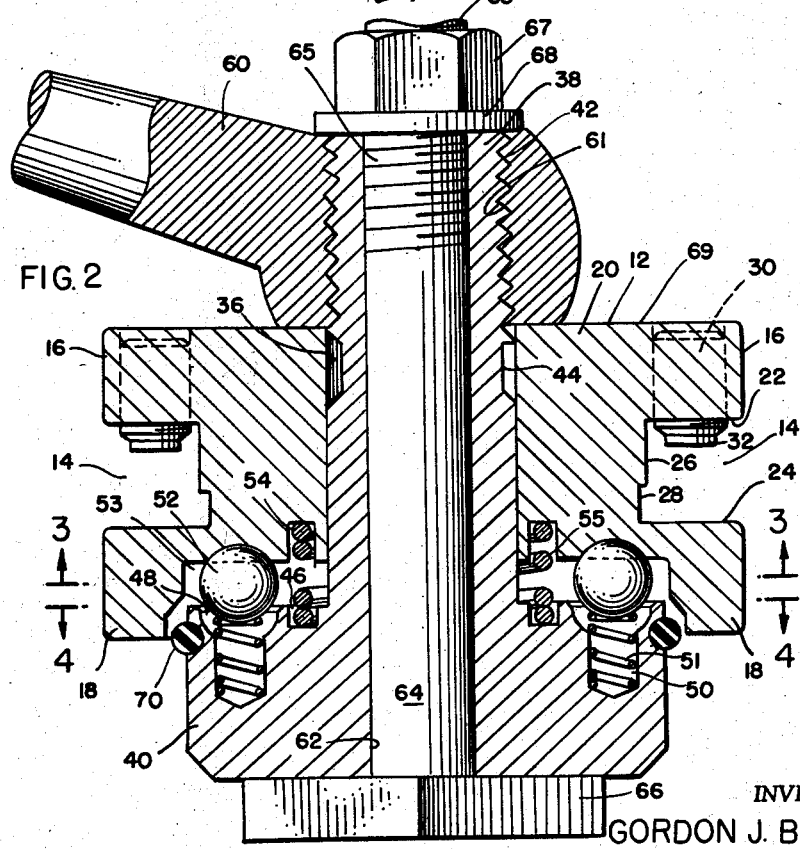
INVENTOR:
GORDON J. BENES
BY
Silverman, Mullin & Cass
ATT'YS Oct. 13, 1959 G. J. BENES 2,908,195
TURRET TOOLPOST
Filed Jan. 20, 1958 2 Sheets-Sheet 2
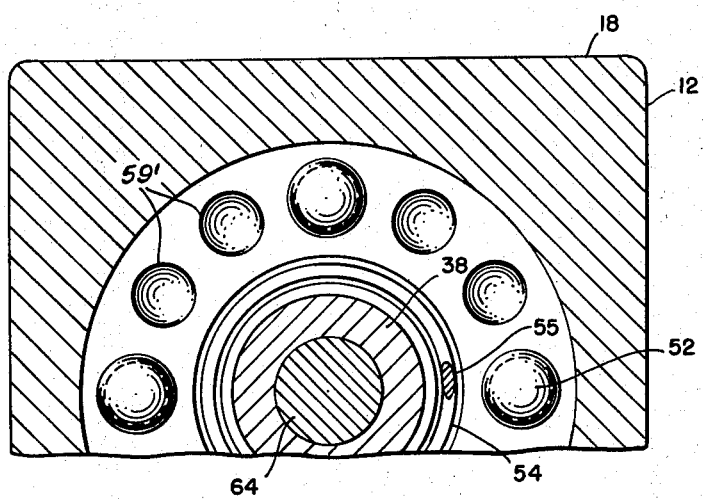
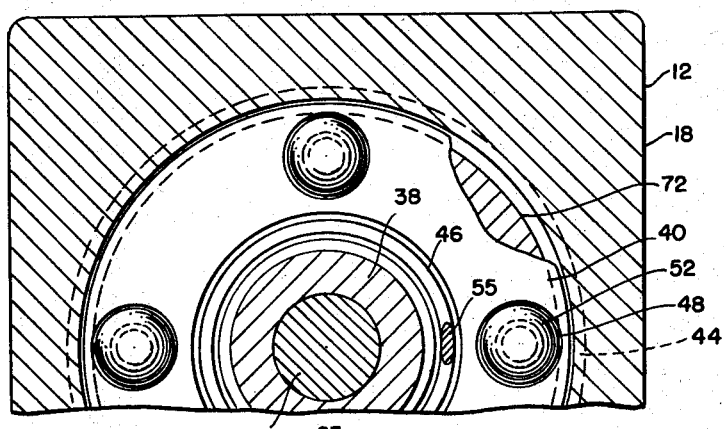
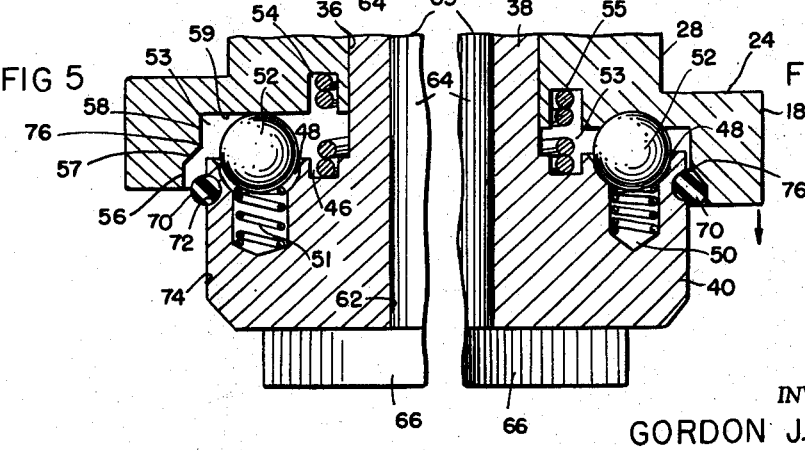
INVENTOR:
GORDON J. BENES
BY
Silverman, Mullin & Carr
ATT'YS

United States Patent Office 2,908,195
Patented Oct. 13, 1959

2,908,195

TURRET TOOLPOST

Gordon J. Benes, Chicago, Ill., assignor to Enco Manufacturing Co., Chicago, Ill., a corporation of Illinois Application January 20, 1958, Serial No. 709,842

2 Claims. (Cl. 82—36)

This invention relates to improvements in turret toolposts of the type that are used for mounting and retaining tools in operational position in machine tools such as lathes and the like. More particularly, this invention relates to improvements in the indexing mechanisms of such toolposts, and also specifically pertains to means for protecting the indexing mechanism against the admission of extraneous materials such as metal chips and the like.

The use of machine tools in metalworking is of course well known. Machines such as bench and turret lathes, shapers, etc., are used for cutting, shaping and fabricating metals in manufacturing innumerable varied metal parts. In these machines mechanisms are provided for rotating or reciprocably moving metal work pieces adjacent tools of various types which are in turn held in position for cutting, shaping, turning, or otherwise working the metal work piece into a desired shape, configuration or design. These tools are in turn held in position by turret toolposts mounted in the machine. In these operations it is oftentimes necessary to use a plurality of tools in sequence and moreover it is sometimes necessary that the tools be moved or held in various positions in relation to the work piece as the work progresses.

In order to accomplish the aforementioned functions turret tool holders are usually provided with means for holding a plurality of various tools and with further means for moving or indexing any one of said tools into operational position or changing the angular disposition of said tools to the work piece.

The indexing mechanism usually employed in such turret toolposts comprise spring-loaded balls adapted to be locked between aligned ball seats formed one in a stationary member and the other in a movable member of said turret, thereby enabling the moveable member to be turned through an exact angular arc so that the tool may be moved through a precise arcuate path and returned to the same position if desired. Obviously, in such close tolerance work as metalworking the aforementioned parts must be precision made to insure precision re-indexing. The admission of any extraneous material into the indexing mechanism which might score the balls or ball seats or in some other manner prevent the exact seating of the balls in the ball seats adversely affects the accuracy of the indexing mechanism and in turn similarly affects the metalworking operation.

Although heretofore attempts to properly protect the internal mechanism of turret toolposts have been made, such attempts have failed either because they were unable to achieve the desired results, or the protective mechanisms provided were so cumbersome, complicated and expensive as to make the same impractical.

It is therefore an important object of this invention to provide a turret toolpost having incorporated therein means for effectively insulating or protecting the internal indexing mechanism against the admission of extraneous materials such as metal chips, particles and the like.

Another object of this invention is to afford protective means having an additional function in affording means for facilitating the indexing operation itself.

A further object is to afford protective means for turret toolpost indexing mechanisms which are effective without adversely affecting the indexing operation itself.

Turret toolposts of the type described hereinabove are usually made of hardened steel and include precision-cut shoulders having sharp edges. Certain parts of the aforementioned protecting means are made of relatively soft compressible materials such as rubber. These latter mentioned parts are positioned for movement into abutment with certain of the first mentioned shoulders, where they are compressed in a manner to insure maximum sealing. Obviously, unless precautions are taken the sharp edges will cut into the rubber members, especially under repeated movements and compressions such as are necessary in the use of this device.

It is therefore another important object of this invention to afford a turret toolpost of the character described in which the indexing mechanism protecting means is so designed that effective sealing is achieved in such a manner that the compressible members of the sealing means do not at any time come in contact with the sharp shoulder edges of the housing, thereby avoiding excessive wear and cutting of said compressible members.

Yet, a further object is to provide indexing mechanism sealing means which not only does not adversely affect the indexing operation, but actually assists in facilitating the same so that said operations are more readily and easily performed than heretofore.

Still another object is to afford a sealed turret toolpost of the character described of simple, inexpensive construction yet sturdy and effective and utilizing a minimum number of additional parts as compared to the standard unprotected and unsealed turret toolpost.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a perspective view of my improved turret toolpost showing a tool in phantom outline held in operational position therein;

Fig. 2 is a vertical sectional view showing the turret toolpost in its inoperative unsealed position;

Fig. 3 is a fragmentary sectional view taken on the plane of line 3—3 in Fig. 2 of the drawings and viewed in the direction indicated;

Fig. 4 is a similar sectional view taken on the plane of line 4—4 in Fig. 2, viewed in the direction indicated, and with portions broken away to show details of construction;

Fig. 5 is a fragmentary vertical sectional view showing the indexing mechanism in non-operational position and the lower protecting mechanism in non-sealing relationship; and Fig. 6 is a similar vertical sectional view but showing the indexing mechanism in fully locked position and the protecting mechanism in sealing relationship.

In Fig. 1 of the drawings reference numeral 10 indicates generally a turret toolpost in which a tool T, shown in phantom outline, is supported in operational position in a tool block 12. The block 12 is made of hardened steel and provides a tool slot 14 (as shown in Figs. 1 and 2 of the drawings) within which the tool T, or a tool holder within which the tool is positioned, is clamped. There are four such tool slots 14 provided in the tool block 12, said slots being defined by a pair of flanges 16 and 18 provided on all four sides of the block. The flanges 16 and 18 merely comprise extensions of the peripheral edges of the central block portion 20 formed at the top and bottom of the block so that each slot 14 is defined by a top wall 22, a bottom wall 24, and an inner vertical wall 26 having an undercut lower portion 28.

Clamping means for holding the tool in position within the tool slot 14 are provided and in the embodiment chosen for illustration comprise a plurality of set screws such as 30 having bottom bearing members 32 integrally formed therein, said set screws being positioned in screw-threaded openings such as 34 formed in spaced relationship along the four peripheral edges of the upper flange 16. As shown in Fig. 1 of the drawings, the bearing members 32 when screwed down clamp the tool against the bottom surface 24 of the tool slot 14.

Tool block 12 is formed with a centrally-bored longitudinally-extending opening 36 through which may be positioned a center post member 38 having an enlarged circular base 40. The upper portion of the center post 38 is screw-threaded as at 42 with said screw threads terminating in an intermediate annular undercut groove 44. The top surface of the center post base 40 is formed with an annular groove 46, the purpose of which will be disclosed as the description proceeds, and is further formed with a plurality of spaced-apart annular ball seat openings 48. In the embodiment chosen for illustration there are four such ball seats as shown in Figs. 2, 4 and 5 of the drawings. Each ball seat 48 is further formed with a depending annular reduced-diameter portion 50 within which may be positioned a coil spring such as 51. The bottom of the spring 51 abuts the bottom of the reduced-diameter portion 50 of the seat 48 with the top of the spring supporting the hardened ball member such as 52, said ball 52 being normally supported above the surface of the ball seat 48.

The bottom of the tool block 20 is formed with an annular central undercut portion 53 which affords a cooperating ball race for the balls 52. This ball race portion will now be described in greater detail.

As shown in Figs. 2, 5 and 6 of the drawings, the undercut ball race portion 53 is formed with an annular groove 54 positioned in alignment with the groove 46 in the post base 40 and adapted to cooperate therewith for positioning therein an equalizer coil spring 55, the function of which will be disclosed as the description proceeds.

The outer wall of the ball race 53 is defined by an irregular shaped wall comprising a segment 56 of maximum diameter opening to the bottom of the race. Said segment 56 terminates in an inclined portion 57 and this segment 57 in turn terminates in a top straight wall portion 58 extending to the top of the race 53 with the top wall of the race designated by reference numeral 59. (This structure is best shown in Fig. 5 of the drawings.) The top wall 59 of the race is formed with a plurality of cooperating ball seats such as 59' (see Fig. 3) and in the embodiment chosen for illustration comprise twelve in number. These seats are aligned with the bottom ball seat 48 so that between them the balls 52 may be seated and retained in position. The manner in which the balls and ball seats cooperate in indexing the turret toolposts will be subsequently disclosed.

A handle or lever 60 is provided having an internally threaded central bore 61 adapted to cooperate with the threads 42 of the post 38 for several purposes, which likewise will be disclosed as the description proceeds.

The center post 38 is formed with a central bore 62 therethrough, through which may be loosely positioned a turret mounting bolt 63. Bolt 63 may comprise a shank 64 having a top portion screw threaded as at 65 and having an enlarged base 66 which, in the embodiment chosen for illustration, is square in shape. A nut 67 and washer 68 is adapted to be threaded at the top of the bolt shown in Figs. 1 and 2 of the drawings.

In operation, let us assume that four different tools are mounted in the unsealed turret toolpost shown in Fig. 2. Each tool may be rapidly indexed into position for use by merely rotating the entire tool block 12 to the desired position. Of course, center post member 38 and turret mounting bolt 63 remain stationary once the entire toolpost has been mounted in the usual manner on a lathe or other machine, with the base 66 of the mounting bolt 63 received in the conventional T-slot tool slide, and the nut 67 tightened. The tools are then locked into the desired position by rotating the handle 60 so that it bears against the top surface 69 of the tool block 12 thereby lowering the block onto the center post base 40. The lowering action is accomplished against the spring action of the equalizer spring 55 until the top 59 of the ball race 53 is brought to bear against the balls 52. The balls 52 are seated in their seats and as the lowering of the block is continued the balls tend to seat themselves into the center post ball seats 48 against the action of the springs 51 compressing the same until the balls are finally brought to bear against the walls of the top and bottom seats. Each of the mounted tools has three working positions enabling each tool to perform more than one operation. A turning tool, for example, can be used for facing by indexing it to the proper angle. The indexing positions are spaced 30 degrees apart as determined by the twelve ball seats 59' in the tool block 12. The indexing mechanism assures precision re-indexing of the tools since the balls can find only one seat in a spherical recess and will always return the tool block to its true position. This is further insured by the accurate milling of the companion ball seats 48 and 59' formed respectively in the center post and tool block.

The equalizer spring 55 facilitates indexing and also helps to seal the internal indexing mechanism against the admission from the top of extraneous chips and particles by keeping the tool block and clamping lever or handle 60 in constant contact whether locked or unlocked.

In order to seal the indexing mechanism against the admission of extraneous materials from the bottom of the turret toolpost, a novel mechanism is provided which will now be described in some detail. As was previously indicated, the ball race 53 is formed with an enlarged-diameter bottom portion as defined by wall 56 and inclined surface 57. This is adapted to cooperate with a sealing O-ring 70 positioned in an annular groove 72 formed in the top portion of the outer wall 74 of the center post base 40. The depth of the groove 72 and the size of the O-ring 70 is such that a portion of the O-ring 70 extends outwardly beyond the outer surface 74 of the base but is still spaced from the wall 56 to afford sufficient clearance to insure ready tightening and loosening of the turret toolpost members. However, as the block and toolpost base are brought together by the tightening of the lever 60 the O-ring 70 is brought into abutment with the inclined surface 57 in such a manner as to sufficiently distort the O-ring so that the ball race 53 is completely sealed as shown in Fig. 6 of the drawings. However, it should be further noted that the distortion of the O-ring 70 is controlled by the seating of the ball 52. Thus, the O-ring is never distorted to the point where a portion of the same is brought to bear against any sharp edge as for example, the angular edge 76 shown at the apex of the ball race surfaces 57 and 58. This, of course, insures against the O-ring being excessively cut or damaged during use of the same. Obviously, as the handle 60 is loosened, the block 12 raises relieving pressure on the O-ring which returns to its undistorted circular shape unsealing the indexing mechanism and permitting ready disassembly of the turret.

It will be apparent from the drawings and foregoing description that I have provided a novel, simple, but most effective turret toolpost having indexing means permitting indexing of the toolpost through at least twelve positions in a full path of 360 degrees. Accurate re-indexing is simply and automatically achieved so that the tool block is always returned to its true position. Indexing is facilitated and the indexing mechanism is effectively sealed against the admission of particles and chips which might score or otherwise interfere with the indexing operation by means of the equalizer spring and the washer and bolt which keep the tool block and clamping lever in constant contact, whether locked or unlocked. This sealing means is of course effective only for sealing against the admission of particles which might otherwise gain access through the top of the turret. The admission of particles through the bottom of the turret is prevented by that portion of the mechanism which includes the O-ring and the shaped outer walls of the tool block ball race. The turret is further designed so that excessive injury to the soft compressible O-ring is effectively eliminated.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. In a turret toolpost for mounting and indexing tools in machine tools; a tool block having a central bore therethrough, said tool block formed with an annular undercut bottom recess defined by a top wall and a side wall, said side wall defined by an annular top vertical wall, an annular intermediate outwardly and downwardly inclined wall and an annular lower vertical wall, a center post positioned in said center bore, said center post having an enlarged circular base, said circular base having a top horizontal surface and an annular vertical surface, a plurality of indexing members positioned on said horizontal surface below the top wall of said recess and projecting above said horizontal surface, the annular vertical surface of said circular base having a groove formed therein encircling the same, a compressible sealing ring positioned in said groove with a portion thereof protruding from the groove, the outermost protruding portion of said sealing ring being in spaced relationship with the annular lower wall of the recess of said tool block, and a locking mechanism for locking said turret toolpost in indexing position by relatively drawing said circular base up into said recess, said indexing members and recess and circular base walls and surfaces being so dimensioned and positioned as to limit the relative upward movement of said circular base by the indexing members being brought into immovable abutment with portions of the top wall of said recess, whereby the top horizontal surface of said circular base remains in spaced relationship with the top wall of said recess and in such position only said downwardly and outwardly inclined wall is brought to bear against said sealing ring thereby compressing the same and sealing the recess against the admission of extraneous matter.

2. The turret toolpost of claim 1 in which said indexing members comprise spring-loaded balls, the top wall of said recess and the top horizontal surface of said base having aligned ball seats formed therein, said balls positioned in said ball seats.

References Cited in the file of this patent

UNITED STATES PATENTS

| | | |
|---|---|---|
| 1,236,997 | Tolles | Aug. 14, 1917 |
| 1,400,614 | Lovejoy | Dec. 20, 1921 |
| 2,366,079 | Wilson | Dec. 26, 1944 |
| 2,403,405 | Sirola | July 2, 1946 |
| 2,527,871 | Bakewell | Oct. 31, 1950 |
| 2,531,198 | Bruet | Nov. 21, 1950 |
| 2,621,396 | Gracchi | Dec. 16, 1952 |
| 2,672,676 | Anderson | Mar. 23, 1954 |
| 2,683,301 | Picand | July 13, 1954 |
| 2,750,001 | Pringle | June 12, 1956 |
| 2,770,993 | Olson | Nov. 20, 1956 |
| 2,790,523 | Fawick | Apr. 30, 1957 |

FOREIGN PATENTS

| | | |
|---|---|---|
| 447,241 | Italy | Apr. 6, 1949 |